United States Patent [19]

Johnston et al.

[11] Patent Number: 4,813,198
[45] Date of Patent: Mar. 21, 1989

[54] VARIABLE SOLAR CONTROL WINDOW ASSEMBLY

[75] Inventors: Norman W. Johnston; Darryl J. Costin, both of Perrysburg, Ohio

[73] Assignee: Libbey-Owens-Ford Co., Toledo, Ohio

[21] Appl. No.: 125,818

[22] Filed: Nov. 23, 1987

Related U.S. Application Data

[63] Continuation of Ser. No. 912,839, Sep. 29, 1986, abandoned.

[51] Int. Cl.⁴ .................................................. E06B 9/00
[52] U.S. Cl. ........................................ 52/171; 52/789; 160/41
[58] Field of Search ................ 52/171, 788, 789, 202; 160/41, 270, 98

[56] References Cited

U.S. PATENT DOCUMENTS

| | | | |
|---|---|---|---|
| 2,860,059 | 11/1958 | Molter et al. | 501/64 |
| 3,056,626 | 10/1962 | Browne | 296/97 B |
| 3,990,784 | 11/1976 | Gelber | 427/160 |
| 4,201,189 | 5/1980 | Saunders | 160/241 |
| 4,235,048 | 11/1980 | Gillery | 52/171 |
| 4,256,808 | 3/1981 | Roy et al. | 52/171 |
| 4,263,760 | 4/1981 | Gell | 52/171 |
| 4,281,488 | 8/1981 | Resibois | 52/173 R |
| 4,290,473 | 9/1981 | Pierson et al. | 160/241 |
| 4,327,967 | 5/1982 | Groth | 52/171 |
| 4,347,835 | 9/1982 | Seemann | 52/171 |
| 4,382,177 | 5/1983 | Heaney | 52/171 |
| 4,382,436 | 5/1983 | Hager | 160/241 |
| 4,508,154 | 4/1985 | Wheeler | 160/98 |
| 4,520,611 | 6/1985 | Shinger et al. | 52/789 |
| 4,536,998 | 8/1985 | Matteucci et al. | 52/171 |
| 4,550,758 | 11/1985 | Johnson et al. | 160/271 |
| 4,562,675 | 1/1986 | Baigas, Jr. et al. | 160/354 |
| 4,604,840 | 8/1986 | Mondon | 52/172 |
| 4,649,980 | 3/1987 | Kunz | 160/310 |

Primary Examiner—David A. Scherbel
Assistant Examiner—Caroline D. Dennison
Attorney, Agent, or Firm—Marshall & Melhorn

[57] ABSTRACT

A variable solar control window assembly includes a pair of spaced parallel planar transparent sheets mounted in a frame. An induced transmission filter sheet is selectively movable between the transparent sheets for varying the solar transmission through the window assembly. The filter sheet includes a carrier layer and one or more coating layers, each coating layer formed as a layer of reflective metal material between two layers of dielectric material. The filter sheet can have bearing/protective layers or strips adhered thereto to seal against the frame and to assist in the sliding movement of the filter sheet with respect to the frame. One or both of the transparent sheets can include an anti-lacerative material layer.

14 Claims, 2 Drawing Sheets

VARIABLE SOLAR CONTROL WINDOW ASSEMBLY

This a continuation of application No. 06/912,839 filed 9-29-86 now abandoned.

BACKGROUND OF THE INVENTION

The present invention concerns window structures for controlling the transmission of solar energy in general and, in particular, to window assemblies for selectively varying the transmission of light in the visible spectrum while selectively blocking solar radiation outside the visible spectrum.

Two methods, or some combination thereof, are generally utilized to reduce the transmission of solar energy through glass. The first method is absorption wherein the solar energy outside a particular band width is absorbed by predetermined elements in the glass and reradiated as heat. For example, U.S. Pat. No. 2,860,059 discloses a light absorbing glass suitable for automotive and architectural glazing applications. In a laminated automotive windshield in which two sheets of glass are bonded to an intermediate layer of polyvinyl butyral resin, the plastic layer is provided with a colored band extending across the upper portion of the windshield which band gradually decreases in light transmittance to provide a build-in glare screen for the windshield. An ultra-violet light absorbing glass is provided at least for the outer glass sheet to protect the colored band from fading in other injurious effects of the sun. The glass is ordinary soda-line-silica glass to which ultra-violet cut-off material such as ceric oxide and titanium dioxide combined with ferric oxide are added.

The other method of reducing the solar transmission is reflection. A reflecting material such as chromium is coated directly on the surface of the glass or onto the surface of a plastic sheet which is then adhered to the glass.

One of the problems associated with solar absorbing and solar reflecting window assemblies is that while a reduction in solar heating may be desirable during the summer, an increase in solar heating may be desirable during the winter. Therefore, many prior art devices have dealt with the problem of varying the solar transmission through a window assembly. For example, U.S. Pat. No. 3,056,626 discloses a device in which a flexible transparent screen of plastic sheet material is mounted between a pair of rollers located above and below an automobile windshield. A pair of spaced apart transparent plastic sheets are provided for guiding the flexible sheet during movement with respect to the windshield. The flexible sheet is provided with portions having different light transmissive or light filtering characteristics to provide for selective variation of solar transmission.

A moveable transparent or non-transparent shade can also be located in a window assembly between two fixed panes of glass such as shown in U.S. Pat. Nos. 4,281,488; 4,347,835; 4,382,436; and 4,508,154. U.S. Pat. No. 4,290,473 discloses a device for controlling light transmission in which a pair of spaced planar parallel films are placed adjacent a window opening and are moveable relative to one another. The films have uniformly and linearly varying light transmitting characteristics and are moved generally in opposite directions so that a substantially uniform degree of light transmission is achieved over the entire opening area. U.S. Pat. No. 4,520,611 discloses a double pane window having a flexible film disposed between the two panes and a member for stretching the flexible film taut.

Multipane or multi-glazed window assemblies have become an important element in reducing energy losses in buildings. However, as the number of panes increases, so does the weight of the assembly. Therefore, a window assembly having a flexible film in place of an intermediate pane of glass provides the advantage of reduced weight.

SUMMARY OF THE INVENTION

The present invention concerns an induced transmission filter sheet selectively moveable along a path between two parallel spaced apart planar transparent sheets in a window assembly. The filter maintains high transmission over the visible part of the solar spectrum and also has high reflection over the infrared part. The filter is formed with one or more coatings which are applied to one side of a transparent film carrier. Each of the coating layers is a sandwich of a layer of metallic reflective material between two layers of dielectric material. The dielectric material induces more light transmission through the coating than the metallic material used alone. The pattern of the coating layers on the carrier can be varied in material and geometrically to obtain different solar transmission characteristics.

The transparent sheets can be formed of any suitable material such as glass or plastic. One or both of the transparent sheets can be of the anti-lacerative type wherein a layer of polyvinyl butyral is adhered to the inside of a glass substrate.

The filter sheet can be guided along a path between the transparent sheets by the engagement of opposed peripheral edges of the filter sheet in recesses formed in a frame for sealingly retaining the transparent sheets. Bearing/protective layers or strips can be adhered to opposite surfaces of the filter sheet t cooperate with adjacent surfaces in the recesses to seal and assist in sliding movement of the filter sheet.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
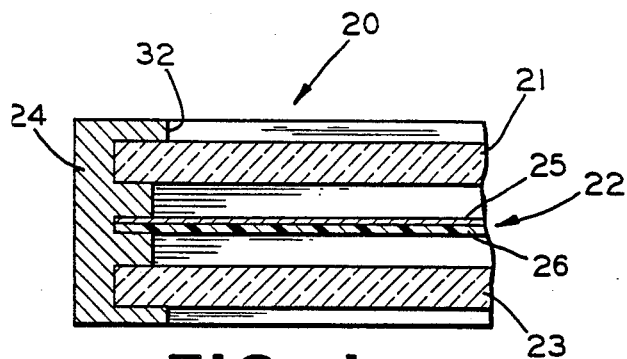
FIG. 1 is a fragmentary cross-sectional view of a window assembly including a filter sheet for controlling solar gain according to the present invention.

Referring to FIG. 1, there is shown a window assembly 20 according to the present invention. The assembly 20 can be, for example, a multipane architectural glazing assembly including an outer transparent sheet 21, an intermediate filter sheet 22, and an inner transparent sheet 23. The sheets 21, 22 and 23 are in parallel planar, spaced apart relationship and are mounted in a frame 24. Typically, the transparent sheets 21 and 23 are formed of glass and the filter sheet 22 includes a coating layer 25 adhered to a carrier layer 26. The carrier layer 26 can be any suitable flexible transparent material such as a polyester of polyethylene terthalate. However, the sheets 21 and 23 can be of any suitable material such as plastic.

Figure 2:
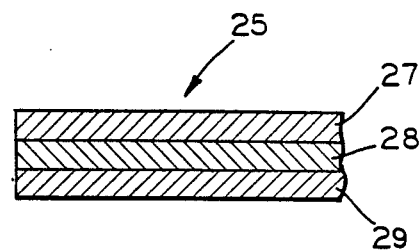
FIG. 2 is a fragmentary cross-sectional enlarged view of the coating layer on the filter sheet of FIG. 1.
Figure 3:
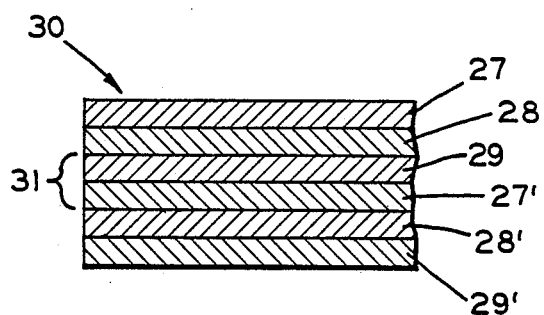
FIG. 3 is a fragmentary cross-sectional view of an alternate embodiment of the filter sheet coating layer according to the present invention.

The coating layer 25 is shown in more detail in FIG. 2. A dielectric material layer 27 is formed on one side of a reflective metal layer 28 which has a dielectric layer 29 formed on the other side thereof. The combination of a layer of reflective material between layers of dielectric material provides or induces more light transmission than the metallic layer used along. Thus, such a coating is known as an induced transmission filter. Also, two or more of the coating layers 25 can be combined to form an induced transmission filter of the desired characteristics. For example, a filter coating layer 30 is shown in FIG. 3. The coating layer 30 consists of a first dielectric layer 27, a second layer of reflective metal 28, a third layer of dielectric 29, a fourth layer of dielectric 27', a fifth layer of reflective metal 28' and a sixth layer of dielectric 29'. The dielectric layers 29' and 27' can actually be considered as one double thickness dielectric layer 31. Thus, the layer 31 would be the third layer, the layer 28' would be the fourth layer and the layer 29' would be the fifth layer. Additional ones of the coating layers 25 shown in FIG. 2 can be added to the stack to obtain the desired filter characteristics.

The dielectric layers can be formed of such materials as zinc oxide, titanium dioxide, indium oxide, and tin oxide. The reflective metal layers can b ®formed of materials such as silver, gold, copper, and aluminum. Typically, the total thickness of the two dielectric layers and the one reflective layer is in the range of two hundred twenty-five to one thousand two hundred fifty angstroms. The reflective layer can be from twenty-five to two hundred fifty angstroms and each dielectric layer can be from one hundred to five hundred angstroms. A carrier sheet having two coatings of a zinc oxide dielectric/silver reflective layer combination has been found to meet the Federal Illuminant A standards of at least 70% transmission in the visible spectrum and has a total solar transmission of less than 40%, and a total solar reflection greater than 25%.

Figure 4:
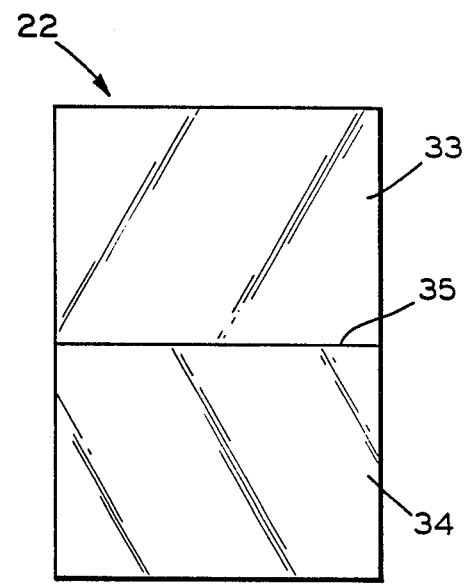
FIG. 4 is a front elevational view of a filter sheet according to the present invention.

The solar transmission characteristics of the filter sheet 22 of FIG. 1 can be made variable by fixing a predetermined pattern on the filter sheet and moving the filter sheet with respect to an opening or aperture 32 in the window frame 24. As shown in FIG. 4, the filter sheet 22 can be divided into two areas 33 and 34 along a generally horizontal dividing line 35. Typically, the areas 33 and 34 are approximately equal in size. Various combinations of solar transmission and blocking values can be obtained by forming the areas 33 and 34 with different filter characteristics. For example, the area 33 could be formed from the clear transparent carrier layer 2 of FIG. 1 and the area 34 could be formed of the carrier layer 26 and the coating layer 25. If the filter sheet 22 has a vertical dimension which is greater than the vertical dimension of the window opening, and the sheet is moved vertically with respect to the window opening, the amount of the window opening covered by portions of the areas 33 and 34 can be selectively varied to vary the amount of solar transmission through the window opening. Of course, the area 33 could also be formed with one or more coating layers of the same or different materials than those used in the coating layer on the area 34 in order to provide different solar transmission characteristics.

Figure 5:
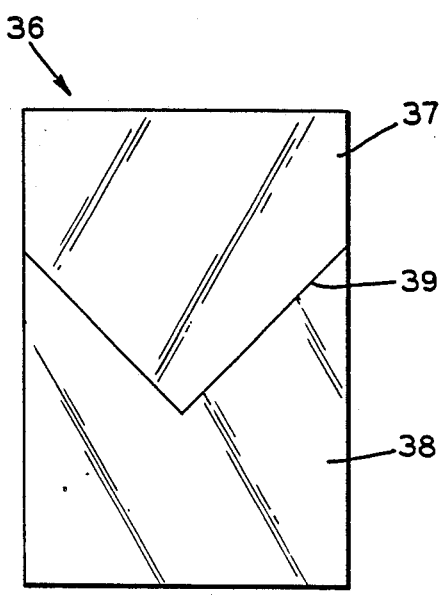
FIG. 5 is a front elevational view of an alternate embodiment of a filter sheet according to the present invention.
Figure 6:
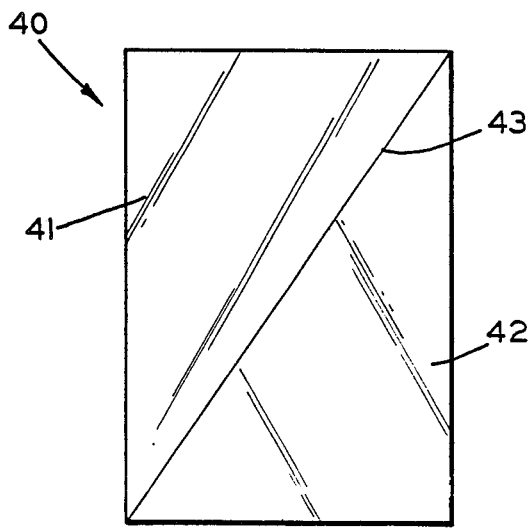
FIG. 6 is a front elevational view of a second alternate embodiment of a filter sheet according to the present invention.

There is shown in FIG. 5 an alternate embodiment of a filter sheet 36 in which an upper filter area 37 and a lower filter area 38 are defined by a generally V-shaped line 39. A second alternate embodiment of a filter sheet 40 is shown in FIG. 6 in which generally triangular areas 41 and 42 are defined by a diagonal line 43.

Figure 7:
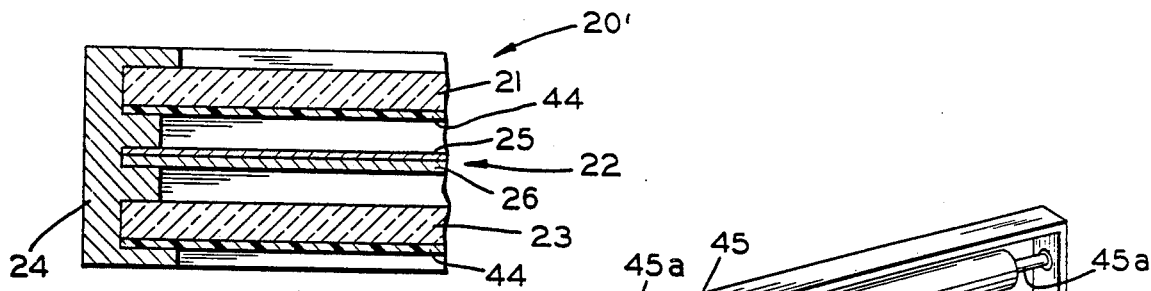
FIG. 7 is a fragmentary cross-sectional view of a window assembly according to the present invention including a filter sheet and anti-lacerative transparent sheets.

There is shown in FIG. 7 an enlarged fragmentary cross-sectional view of an alternate embodiment of the window assembly shown in FIG. 1 in which breakage is of concern and a protective layer has been added to the transparent sheets. A window assembly 20' has transparent sheets 21 and 23 and filter sheet 22 mounted in the frame 24. The transparent sheet 21 can have a protective layer 44 adhered to an inner surface thereof to form a window assembly of a anti-lacerative type. Typically, the protective layer 44 is formed of polyvinyl butyral material. In the alternative, the protective layer 44 could be adhered to a surface of the transparent sheet 23, or, as shown, both of the transparent sheets 1 and 23 could have a protective layer 44 adhered thereto.

Figure 8:
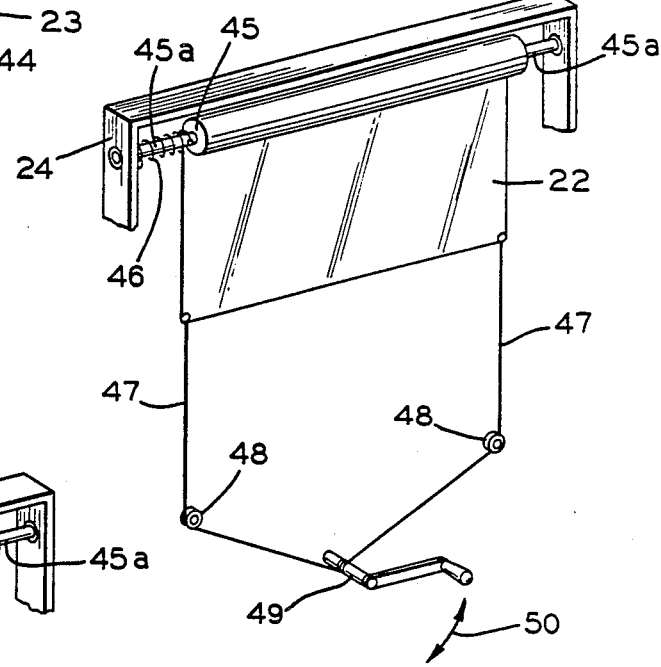
FIG. 8 is a perspective view of a mechanism for moving a filter sheet according to the present invention.

There is shown in FIG. 8 one means for mounting the filter sheet 22 for movement in the frame 24 with respect to the transparent sheets 21 and 23. FIG. 8 is a perspective, partially schematic view showing the filter sheet 22 mounted in an upper portion of the frame 24. An upper end of the filter sheet 22 is attached to and wrapped around a roller 45 on an axle 45a rotatably attached to the frame 24. One end of a helical return spring 46 is attached to the axle 45a and the other end is attached to the frame 24. The lower corners of the filter sheet 22 are attached to one end of each of a pair of cables 47. The cables 47 can be guided by a pair of pulleys 48 which are rotatably mounted (not shown) in the window assembly. The opposite ends of the cables 47 can be attached to a crank arm 49. As shown by an arrow 50, the crank arm 49 is rotatable in opposite directions for raising and lowering the filter sheet 22. The return spring 46 is utilized to assist in rolling up the filter sheet 22 on the roller 45 when the crank arm 49 is rotated in a direction to allow the filter sheet 22 to be raised. The cables 47, the pulleys 48 and the crank arm 49 are merely representative of many conventional means, both manual and automatic, for raising and lowering the filter sheet 22.

Figure 9:
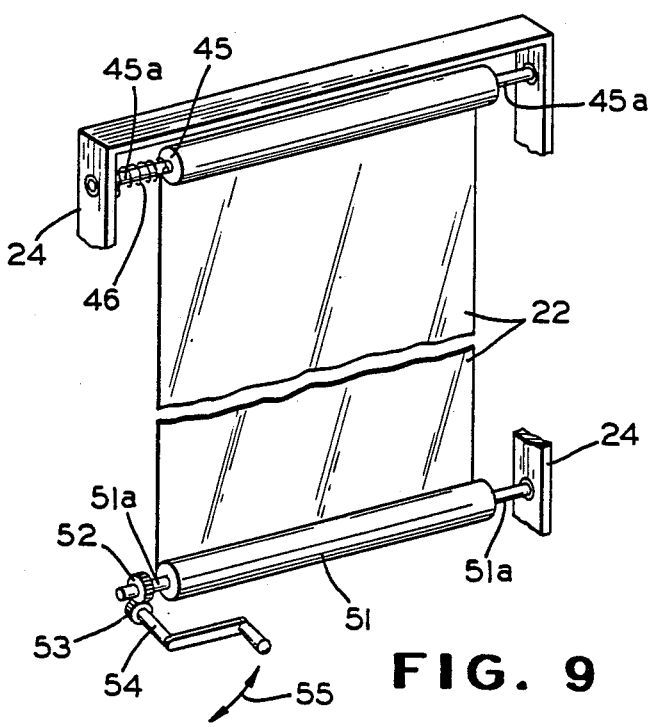
FIG. 9 is a perspective view of an alternate embodiment of a mechanism for moving the filter sheet according to the present invention.

There is shown in FIG. 9 an alternate embodiment of means for moving the filter sheet 22 along a predetermined path in the window frame 24. The upper end of the filter sheet 22 is mounted on the roller 45 with the axle 45a and the return spring 46 as previously discussed with respect to FIG. 8. The lower end of the filter sheet 22 is attached to a roller 51 on an axle 51a rotatably attached to the frame 24. A gear 52 is attached to one end of the axle 51a and meshes with a gear 53 mounted on the end of a crank arm 54. The crank arm 54 can be rotated in either direction as depicted by the arrow 55 to move the filter sheet 22 in a vertical direction.

Figure 10:
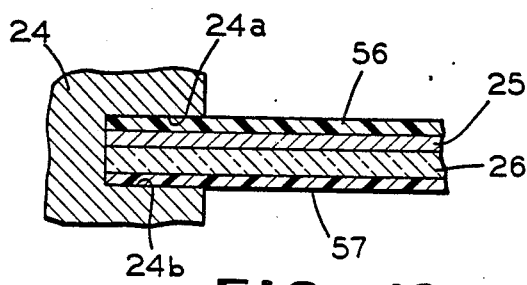
FIG. 10 is a fragmentary cross-sectional view of a filter sheet according to the present invention including protective coatings.

Although the filter sheet 22 is utilized to variably control solar transmission through the window assembly, it also functions as an element which contributes to the insulating properties of a multi-pane window assembly. It is desirable to reduce the air circulation both past the two transparent sheets and also in the area between the two transparent sheets. There is shown in FIG. 10 an enlarged fragmentary cross-sectional view of the window frame 24, the coating layer 25 and the carrier layer 26 of FIG. 1. The frame 24 is typically formed with a recess for retaining the peripheral edge portion of the filter sheet 22. A pair of opposed surfaces 24a and 24b respectively face the outer surfaces of the coating layer 25 and the carrier layer 26. It is desirable to have the outer surfaces of the coating layer and carrier layer abut the opposed surfaces of the frame recess in order to reduce the circulation of air from one side of the filter sheet to the other side of the filter sheet. However, it is also desirable to have the filter sheet 22 move as freely as possible in the recess when changing the solar transmission value.

Since the coating layer 25 and the carrier layer 26 typically are not abrasion resistant materials, some form of protection is desirable. Therefore, a bearing/protective layer 56 can be applied to the outer surface of the coating layer 25 and a bearing/protective layer 57 can be applied to the outer surface of the carrier layer 26. The layers 56 and 57 abut the surfaces 24a and 24b thereby sealing the filter sheet 22 in the recess in the frame 24. However, the layers 56 and 57 have a relatively low coefficient of friction so that the filter sheet 22 can easily move in the recess in the frame 24. The bearing/protective layers 56 and 57 can be formed of any suitable material such as a sheet of polyvinyl butyral, or a hardcoat layer.

Figure 11:
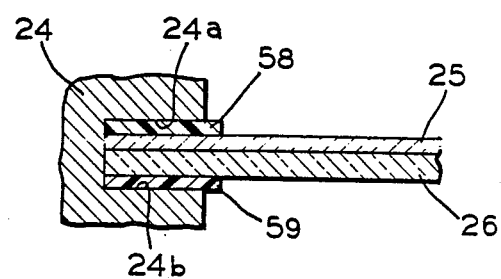
FIG. 11 is a fragmentary cross-sectional view of a filter sheet according to the present invention showing an alternate embodiment of a protective coating.

There is shown in FIG. 11 an alternate embodiment of the protective layers shown in FIG. 10. A bearing/protective strip 58 can be applied to an outer surface of the peripheral edge of the coating layer 25 and a similar bearing/protective strip 59 can be applied to an outer peripheral edge surface of the carrier layer 26. The strips 58 and 59 respectively abut the opposed surfaces 24a and 24b of frame 24 thereby sealing against air circulation and providing a bearing surface for movement of the transparent sheet 22.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A window assembly for controlling solar transmission including a pair of transparent sheets mounted in a frame in spaced apart generally parallel planes, comprising a filter material sheet having a coating of induced transmission filter material over at least a portion of said filter material sheet and mounted for movement in the frame along a path between the transparent sheets, said filter material sheet having relatively high solar visible transmission and substantially less solar transmission outside the visible spectrum over said portion of said filter material sheet; and means for selectively moving said filter material sheet along said path whereby the solar transmission through the assembly is varied.

2. The assembly according to claim 1 wherein the Illuminant A transmission through said filter material is at least seventy percent.

3. The assembly according to claim 1 wherein at least one of the transparent sheets is formed of a first sheet of glass defining an outwardly facing surface, and a sheet of polyvinyl butyral adhered to an inwardly facing surface of said glass, said transparent sheet spaced from said filter material sheet.

4. The assembly according to claim 1 wherein said filter material sheet includes five layers, the second and fourth layers are of a reflective metal material and the first, third and fifth layers are of a dielectric material.

5. The assembly according to claim 1 wherein said filter material sheet includes a first layer of dielectric material, a second layer of reflective material, and a third layer of dielectric material.

6. The assembly according to claim 5 wherein said filter material sheet includes a fourth layer of dielectric material, a fifth layer of reflective material, and a sixth layer of dielectric material.

7. A window assembly for controlling solar transmission comprising:

a frame defining a window aperture;

a pair of generally parallel, spaced apart planar transparent sheets mounted in said frame and closing said window aperture;

a filter sheet including an induced transmission filter film over at least a portion of said filter sheet and mounted for movement in said frame along a path between said transparent sheets, said filter sheet having at least a seventy percent Illuminant A transmission and substantially less solar transmission outside the visible spectrum over said portion of said filter sheet; and means for selectively moving said filter sheet along said path whereby solar transmission through said window aperture is varied.

8. A window assembly for varying solar transmission having a pair of generally parallel, spaced apart planar transparent sheets mounted in a frame defining a window aperture closure, comprising:

an induced transmission filter sheet having a carrier layer and a coating layer, said filter sheet having relatively high solar visible transmission and substantially less solar transmission outside the visible spectrum;

means for slidably mounting said filter sheet between transparent sheets mounted in a frame; and means for moving said filter sheet along a predetermined path between the transparent sheets whereby solar transmission through a window aperture defined by the frame is varied.

9. The assembly according to claim 8, wherein said means for slidably mounting includes at least one recess formed in the frame for engaging a peripheral edge portion of said filter sheet and defining said predetermined path.

10. The assembly according to claim 9 wherein said means for slidably mounting includes a sheet of plastic material adhered to said coating layer and abutting a wall of said recess.

11. The assembly according to claim 9 wherein said means for slidably mounting includes a strip of plastic material adhered to said coating layer along said peripheral edge portion and abutting a wall of said recess.

12. The assembly according to claim 9 wherein said means for slidably mounting includes a low coefficient of friction material adhered to both sides of said filter sheet at said peripheral edge portion and abutting opposed walls of said recess.

13. The assembly according to claim 8 wherein said means for moving includes a roller attached to one end of said filter sheet and rotatably mounted in the frame and means for rotating said roller in opposite directions.

14. The assembly according to claim 8 wherein said means for moving includes a pair of rollers each attached to an opposite end of said filter sheet and means for rotating at least one of said rollers in opposite directions.

* * * * *